United States Patent [19]

Kidwell, Jr. et al.

[11] 4,450,069

[45] * May 22, 1984

[54] METHOD FOR UPGRADING DIENE-CONTAINING HYDROCARBON MIXTURES

[75] Inventors: Louis E. Kidwell, Jr.; Dysart E. Holcomb, both of Shreveport, La.

[73] Assignee: Pennzoil Company, Houston, Tex.

[*] Notice: The portion of the term of this patent subsequent to Nov. 24, 1998 has been disclaimed.

[21] Appl. No.: 300,450

[22] Filed: Sep. 8, 1981

Related U.S. Application Data

[63] Continuation-in-part of Ser. No. 116,863, Jan. 30, 1980, Pat. No. 4,302,255.

[51] Int. Cl.³ .................... C10G 29/02; C07C 7/177
[52] U.S. Cl. .................................. 208/255; 208/293; 585/811; 585/856
[58] Field of Search ............... 208/255, 293; 585/856, 585/811

[56] References Cited

U.S. PATENT DOCUMENTS

| | | | |
|---|---|---|---|
| 2,039,070 | 4/1936 | Duecker | 528/389 |
| 2,114,315 | 4/1938 | Patrick, Jr. | 208/255 |
| 2,135,747 | 11/1936 | Duecker | 528/389 |
| 2,286,343 | 6/1942 | Chechot | 208/293 |
| 2,806,843 | 9/1957 | Welch | 528/389 |
| 2,854,399 | 9/1958 | Weller | 208/293 |
| 3,231,546 | 1/1966 | Bertozzi et al. | 528/389 |
| 3,264,239 | 8/1966 | Rosen et al. | 528/389 |
| 3,459,717 | 8/1969 | Signouret | 528/389 |
| 3,823,019 | 7/1974 | Dale et al. | 106/287.32 |
| 3,887,504 | 7/1974 | Woo | 260/17.4 R |
| 3,972,853 | 8/1976 | Gorring et al. | 208/293 |
| 3,997,355 | 12/1976 | Santucci et al. | 106/287.32 |
| 4,011,179 | 3/1977 | Woo et al. | 528/389 |
| 4,021,334 | 5/1977 | Gorring et al. | 208/293 |
| 4,022,626 | 5/1977 | McBee et al. | 106/287.32 |
| 4,058,500 | 11/1977 | Vroom | 528/389 |
| 4,155,771 | 5/1979 | Cassar | 106/287.32 |
| 4,164,428 | 8/1979 | Simic | 528/389 |
| 4,177,097 | 12/1979 | Espenscheid | 528/389 |
| 4,190,460 | 2/1980 | Cassar | 106/287.32 |
| 4,302,255 | 11/1981 | Kidwell, Jr. et al. | 106/275 |
| 4,311,826 | 1/1982 | McBee et al. | 528/389 |

FOREIGN PATENT DOCUMENTS

| | | | |
|---|---|---|---|
| 193722 | 3/1923 | United Kingdom | 208/293 |
| 306421 | 2/1929 | United Kingdom | 585/856 |
| 712618 | 7/1954 | United Kingdom | 208/293 |

OTHER PUBLICATIONS

Chemical Abstracts, p. 3424.
Chemical Abstracts, vol. 43, pp. 995-1000.
Chemical and Engineering News, p. 8, Oct. 15, 1979.
Kirk-Othmer, Encyclopedia of Chem. Tech., 2d Ed., vol. 17, p. 627.
Currell et al., New Uses of Sulfur, Advances in Chem. Series 140, Amer. Chem. Soc., Wash., D.C., pp. 1-17 (1975).
Fike, H. L., Sulfur Coatings, A Review and Status Report, Sulfur Use Symposium; Madrid, Spain (May 19, 1976).

*Primary Examiner*—Delbert E. Gantz
*Assistant Examiner*—O. Chaudhuri
*Attorney, Agent, or Firm*—Lowe, King, Price & Becker

[57] ABSTRACT

There is disclosed a method for upgrading of hydrocarbon mixtures, so as to reduce their content of gum precursors such as diolefins and pseudo-diolefins, and provide a resulting product mixture suitable for mild hydrogenation, for use as a motor fuel or as a feed stock to an extraction unit. The process comprises obtaining a hydrocarbon mixture containing about 60-90 wt. % of aromatic components, about 3-40 wt. % of dienes and pseudodienes, and monoolefins, and up to about 6 wt. % of relatively unreactive organic compounds, reacting this mixture with elemental sulfur in the approximate weight ratio of about 5-95 wt. % of the hydrocarbon mixture with about 95-5 wt. % of elemental sulfur, the reaction being carried out at a temperature in the range of 100°-150° C. for about 10 minutes to 24 hours with good mixing, removing the unreacted materials by distillation and separating a sulfur-hydrocarbon reaction product to provide the upgraded hydrocarbon mixture.

7 Claims, 1 Drawing Figure

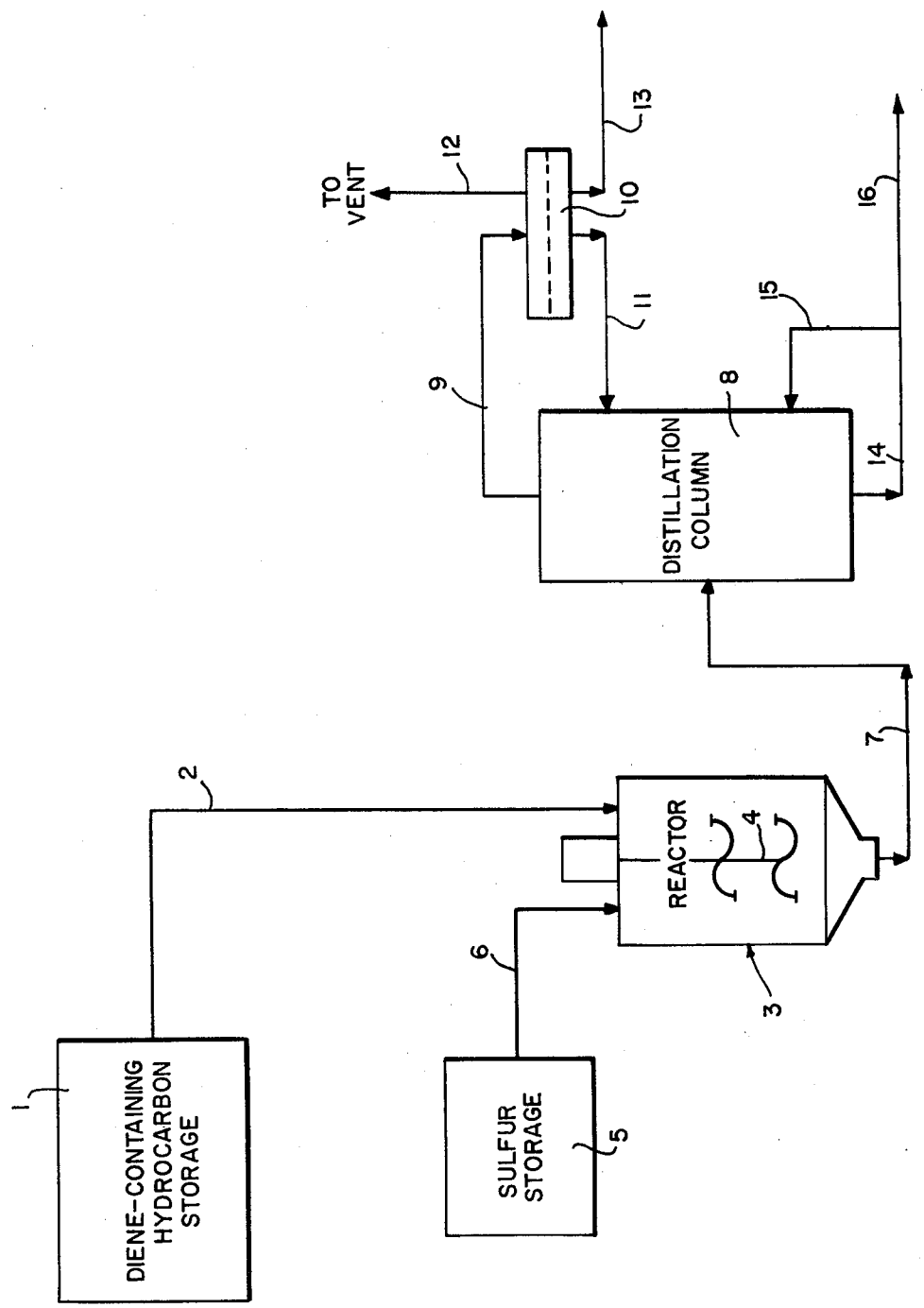

METHOD FOR UPGRADING DIENE-CONTAINING HYDROCARBON MIXTURES

CROSS-REFERENCE TO RELATED APPLICATIONS

This application is a continuation-in-part of application Ser. No. 116,863, filed Jan. 30, 1980 now U.S. Pat. No. 4,302,255, issued Nov. 24, 1981.

TECHNICAL FIELD

This invention relates to methods for upgrading diene-containing by-product hydrocarbon mixtures, and compositions formed from this process, which are suitable for aromatic extraction and in motor fuels.

BACKGROUND ART

Petrochemical refineries practice numerous processes for steam cracking or pyrolysis of hydrocarbons, such as ethane, propane, and heavier feed stocks, such as naphtha and the like, to produce ethylene and propylene. In these processes, an aromatic-rich concentrate is often produced as a by-product in such processes. In addition, plants are engaged in the processing of coal in order to produce light oils which are also rich in valuable aromatics.

In all these processes, however, it is necessary to provide a feedstock in which gum precursors such as dienes and pseudodienes have been substantially removed or converted to useful materials before such feedstocks can be employed in these aromatic extraction or processing units. The present invention provides a method by which aromatic-rich concentrates which heretofore were not susceptible to use as feedstocks in these processes, may be processed in order to remove gum precursors and place these aromatic concentrates in condition for use as feedstocks in aromatic extraction processes to produce the useful products described, as well as other processes.

It is known in the art to upgrade such by-product hydrocarbon mixtures, such as depentanized aromatic concentrate (DAC), heavy aromatic concentrate (HAC), dripolene, light oil, pyrolysis gasoline, light oil from coal processing and the like, by converting the diolefins contained in these materials to monoolefins and, if aromatics extraction is the goal of the process, converting the monoolefins to saturates. The processing method commonly employed to remove these olefinic materials is selective catalytic hydrogenation.

Processing sequences revealed by Griffiths and Luntz of the M. W. Kellog Co., *The Oil and Gas Journal*, Feb. 19, 1968; the article by Hobson, "Modern Petroleum Technology—BP Selective Hydrogenation Process," in *Applied Science*, 1973; and the article by Brownstein, *Petroleum Technology*, "The Impact of the Energy Crisis," published by Petroleum Publishing Co., all outline two-stage catalytic hydrogenation processes to hydrotreat a variety of aromatic concentrate type materials. The first stage selectively hydrogenates the diolefins in these concentrates to monoolefins. The operating conditions of the first stage include temperatures low enough so that the diolefins are hydrogenated to monoolefins instead of polymerizing, which causes catalyst deactivation. The effluent from stage one, with prior desulfurization if necessary, is a suitable blending stock for the motor fuel pool. The monoolefins in this material contribute to its octane number.

If ultimate use of the hydrotreated product is to be as a feedstock for extraction of valuable aromatic compounds, such as benzene and toluene, further catalytic hydrogenation and desulfurization is necessary. This is accomplished in the second stage of the hydrogenation unit, which operates at higher temperatures, where monoolefins are converted to saturates and molecularly-bound sulfur is converted to $H_2S$. These higher temperatures would polymerize any diolefins present, thus fouling the catalyst and necessitating shutdown of the unit to regenerate or replace the catalyst. The effluent from the second stage of the hydrogenation unit can then be charged to a unit designed to extract the valuable aromatic components of these materials.

Also employed in current methods of upgrading aromatic concentrate type materials is distillation of the effluent from the first stage of the hydrogenation unit before charging to the second stage to give an aromatic concentrate, especially if final products are to be extracted aromatics. After complete saturation and desulfurization in the second stage, methods for purification of the aromatics such as solvent extraction, extractive distillation, etc. are employed.

The above-mentioned methods for removing dienes, olefins, and sulfur require a great deal of hydrogen. This requirement, coupled with reactor down time for catalyst maintenance (due to gum forming) and down time to remove gum from preheaters, determines the economics of upgrading aromatic concentrate materials using these processing methods, and, when compared with a method requiring little or no hydrogen and little maintenance down time, these economics are relatively disadvantageous.

It is also known in the prior art that sulfur can be reacted with olefins such as ethylene. Illustrative of this type of prior art are U.S. Pat. Nos. 2,039,979 and 2,135,747 to Duecker. Sulfur has also been modified with an olefinic hydrocarbon polymer derived from petroleum, as illustrated by U.S. Pat. No. 4,059,500 to Vroom. Other prior art has modified sulfur with styrene, styrene derivatives, or a cyclodiene such as dicyclopentadiene. Exemplary of this type of prior art is U.S. Pat. No. 3,459,717 to Signouret, U.S. Pat. No. 2,806,843 to Welsh, U.S. Pat. No. 3,823,019 to Dale et al., U.S. Pat. No. 3,887,504 to Woo, U.S. Pat. No. 3,997,355 to Santucci et al., U.S. Pat. No. 4,001,179 to Woo, U.S. Pat. No. 4,022,626 to McBee et al., U.S. Pat. No. 4,001,179 to Woo, U.S. Pat. No. 4,022,626 to McBee et al., U.S. Pat. No. 4,164,428 to Simic, the text at page 627 of Kirk-Othmer, *Encyclopedia of Chemical Technology*, 2nd Edition, Vol. 17, and B. R. Currell et al., Chapter 1 in *New Uses of Sulfur* (J. R. West, ed.), Advances in Chemistry Series 140, American Chemical Society, Washington, D.C., pp 1–17 (1975). The McBee et al. patent shows the use of dicyclopentadiene and styrene in combination as a modifying composition for sulfur.

Other prior art showing sulfur in combination with styrene or dicyclopentadiene is exemplified by U.S. Pat. No. 3,231,546 to Bertozzi et al. and by U.S. Pat. No. 3,264,239 to Rosen et al.

In addition, several formulations of a modified sulfur product called Sulphlex have been developed by the Southwest Research Institute in order to replace or extend asphalt in highway construction. Illustrative of these formulations is Sulphlex 126, which contains 61 wt. % sulfur and 13 wt. % of each of dicyclopentadiene, vinyltoluene and a light cut of coal tar; Sulphlex 230, which contains 70 wt. % sulfur and 15 wt. % of each of dicyclopentadiene and dipentene; and Sulphlex 233, which contains 70 wt. % sulfur, 12 wt. % dicyclopentadiene, 10 wt. % dipentene and 8 wt. % vinyltoluene.

The present invention is directed to the use of sulfur to remove gum precursors from hydrocarbon feedstocks to make the feedstocks useful as starting materials in aromatics extraction, as suitable components in motor fuel blending, and in other applications.

SUMMARY OF THE INVENTION

It is accordingly one object of the present invention to utilize a reaction of sulfur with a relatively low cost by-product hydrocarbon mixture available from petrochemical operations to upgrade the hydrocarbon mixture.

A further object of the present invention is to provide a residual by-product hydrocarbon mixture which is relatively free of dienes, pseudodienes, and other gum precursor compounds.

A still further object is to upgrade residual hydrocarbon mixtures so as to make the mixture suitable as feedstock for aromatic extraction processes or as a component in gasoline blending.

Other objects and advantages of the present invention will become apparent as the description thereof proceeds.

In satisfaction of the foregoing objects and advantages, the present invention provides a method for the upgrading of hydrocarbon mixtures so as to reduce their content of gum precursors such as diolefins and pseudo-diolefins, and provide a resulting product mixture suitable for mild hydrogenation, for use as a motor fuel or as a feed stock to an extraction unit, the process comprising obtaining a hydrocarbon mixture containing about 60–90 wt. % of aromatic components, about 3–40 wt. % of dienes, pseudodienes, and monoolefins, and up to about 6 wt. % of relatively unreactive organic compounds, reacting said mixture with elemental sulfur in the approximate weight ratio of about 5–95 wt. % of the hydrocarbon mixture with about 95–5 wt. % of elemental sulfur, the reaction being carried out at a temperature in the range of 100°–150° C. for about 10 minutes to 24 hours with good mixing, removing the unreacted materials by distillation and separating a sulfur-hydrocarbon reaction product.

BRIEF DESCRIPTION OF THE DRAWING

Reference is now made to the drawing accompanying the application which is a flow sheet for practicing the process of the invention.

BEST MODE FOR CARRYING OUT THE INVENTION

Petrochemical refineries are engaged in the production of ethylene and propylene by steam cracking of ethane, propane, and heavier feedstocks such as naphtha and the like, which results in the production of an aromatic-rich concentrate, a by-product in these processes. Plants engaged in the processing of coal produce light oils which are also rich in valuable aromatics. These aromatic concentrates, referred to as depentanized aromatic concentrates (DAC), heavy aromatic concentrates (HAC), dripolene, pyrolysis gasoline, light oil from coal processing and the like, contain substantial amounts of gum precursors, i.e., dienes and pseudodienes, which must be converted or removed before these materials are suitable for use as a gum-stable motor fuel or as a feedstock to an aromatics extraction unit. Selective catalytic hydrogenation of these aromatic concentrates is required for example to convert the polymerizable diolefins to monoolefins, so as to make the material suitable for motor fuel. Further hydrotreatment and desulfurization of these materials is necessary before charging to an aromatics extraction unit. The present process eliminates the need for conversion of diolefins to monoolefins to saturates via hydrotreatment by removing the diene, pseudodiene, and monoolefinic components from these aromatic concentrates, so as to make them suitable for use as a motor fuel or, after prior desulfurization, as a feedstock for aromatics extraction. Removal of dienes, pseudodienes, and monoolefins from the aromatic concentrate is accomplished by reaction with sulfur.

This reaction product of the sulfur with the gum precursors is analogous to products presently being proposed for use as coatings, for earthen tanks, drainage canals, settling tanks, tailings ponds, product storage piles, and concrete structures. Also, analogous products are being considered as binders of aggregate in highway construction, cast formed structures, as mortar, and as components of roofing shingles. These products and this method of production are fully described and claimed in our parent application, Ser. No. 116,863, filed Jan. 30, 1980.

As pointed out, the present invention provides a process for removal of dienes, pseudodienes, and monoolefins from by-product hydrocarbon mixtures, which hydrocarbon mixtures contain about 60–90 wt. % of aromatic components, about 3–40 wt. % of dienes, pseudodienes, and monoelfins, and up to about 6 wt. % of other relatively unreactive organic compounds, by reacting them with elemental sulfur. Approximately 5–95 wt. % of the hydrocarbon mixture is reacted with about 95–5 wt. % elemental sulfur. In the reaction between the sulfur and the hydrocarbon mixture, the sulfur reacts at least with the olefinic bonds of the diene and pseudodiene components of the hydrocarbon mixture, to result in an effective means of removing diolefins, pseudodiolefins, and monoolefins and other gum precursors from these aromatic concentrates that heretofore could only be converted to monoolefins and saturates by catalytic hydrogenation. An additional process savings is due to the possibility that it would require little or no hydrogen to treat these aromatic concentrates, making them suitable for use in motor fuel or as a feedstock to an extraction unit.

The process is carried out at a temperature in the range of 100°–150° C. The reaction is conducted at either atmospheric or elevated pressure conditions for about 10 minutes to 24 hours, during which time period the reactive phases are vigorously mixed. Unreacted material is removed by distillation at atmospheric and/or reduced pressure. The addition of a small amount of the above-mentioned reaction product has a catalytic effect on the reaction mixture, thus reducing the time needed for the reaction to reach completion.

In general, the process of the invention utilizes the reaction of the aromatic concentrates, described herein as depentanized aromatic concentrate (DAC), heavy aromatic concentrate (HAC), dripolene, pyrolysis gasoline, or light oil from coal processing, mixtures thereof, and the like, with sulfur under conditions such that the unreacted components of the concentrate will flash off the reaction mixture or be removable by distillation. The unreacted organic components are thus made suitable for use as in a gasoline pool with little or no hydrogenation and with prior desulfurization if necessary, or charged to an aromatic extraction unit for benzene and the like.

Several processing advantages are enjoyed with the process of this invention, i.e., (1) eliminating, or at least minimizing, the hydrogen required to convert DAC or HAC type materials for use in fuel processing; (2) eliminating, or at least minimizing, gum formation in preheaters and catalyst beds which now occurs when heating DAC or HAC type materials due to the presence of diolefins and pseudodiolefins in the concentrate; (3) feeding the non-reactive organic phase from the DAC-sulfur and/or HAC-sulfur formation step to either a fuel pool after desulfurization or to a unit designed for recovery of valuable aromatics such as benzene and toluene; and (4) preparation of a relatively inexpensive modified sulfur material with a wide range of commercial applications.

The depentanized concentrate employed as a starting material in the present invention may be generally described as being a residual mixture containing about 60–90 wt. % of aromatic components and about 3–40 wt. % of olefinic components as well as a small portion of aliphatic components. The aromatic components of this mixture generally include materials such as benzene, ethylbenzene, toluene, xylenes, indanes, naphthalene, alkyl substituted materials of this type, and the like. The pseudodiene components of this mixture generally include materials such a styrene, indenes, alkyl substituted materials of this type, and the like. Cyclic compounds include materials such as the cycloolefins including cyclohexane, cyclopentane, cyclobutene, cycloheptane, and the like. Aliphatic materials may include paraffins, both normal and isoparaffins, and the like. Some feedstocks may also contain a small amount of alkynes.

Exemplary by-product hydrocarbon mixtures satisfying the above description are depentanized aromatic concentrate (DAC), heavy aromatic concentrate (HAC), dripolene and light oil from coal processing, and the like, with depentanized aromatic concentrate being particularly advantageous. An especially useful depentanized aromatic concentrate contains about 50–70 wt. % of the aromatic compounds, about 15–40 wt. % of the dienes, pseudodienes, and monoolefins, and up to about 0.5 wt. % of paraffins. The aromatic compounds generally include materials such as benzene, ethylbenzene, toluene, xylenes, indanes, naphthalene, and alkyl-substituted derivatives of these materials. The dienes generally include materials such as di- or tri-olefins, cycloolefins, styrene, indenes, and alkyl-substituted derivatives of these materials. The paraffins generally include both normal paraffins and isoparaffins.

In selecting the feedstock, certain advantages may be obtained if the hydrocarbon mixture contains monoolefins in substantially the same stoichiometric amount for reaction with the sulfur, as there are dienes and pseudodienes present in the mixture.

A further mixture to be used as a feedstock would have the following composition:

TABLE I

| Component | Amount, Wt. % |
|---|---|
| Aromatics | 50–80 |
| Paraffins | 0–10 |

TABLE I-continued

| Component | Amount, Wt. % |
|---|---|
| Monoolefins | 10–40 |
| Dienes & pseudodienes | 10–40 |
| Alkynes | 0–5 |
| Cyclic Aliphatic | 0–10 |

Typical analyses of especially useful DAC compositions are set forth in Table II. As shown in this table, the percentages of the particular dienes present in these especially useful depentanized aromatic concentrates can vary substantially, even though the total percent of dienes remains within a narrow range.

TABLE II

| Component | Amount, Wt. % |
|---|---|
| Aromatics | |
| benzene | 38–58 |
| toluene | 9–13 |
| ethylbenzene | 0.25–0.75 |
| m-xylene | 0.3–0.5 |
| p-xylene | 0.3–0.5 |
| cumene | 0.01–0.05 |
| o-xylene | 0.1–0.5 |
| n-propylbenzene | 0.05–0.5 |
| 1,3,5-trimethylbenzene | 0.1–0.5 |
| sec-butylbenzene | 0.01–0.1 |
| o-ethyltoluene | 0.1–0.7 |
| 1,2,4-trimethylbenzene | 0.5–1.0 |
| o-cymene | 0.01–0.1 |
| indane | 0.5–2.5 |
| Paraffins | 0.0–10.0 |
| Monoolefins | |
| propene | 0.05–0.15 |
| butene | 0.5–1.5 |
| pentene | 0.1–0.5 |
| Dienes & Pseudodienes | |
| butadienes | 1–5 |
| pentadienes | 3–9 |
| hexadienes | 0.5–1.5 |
| pentatrienes | 0.01–0.05 |
| methylpentadienes | 0.05–0.20 |
| styrene | 1.5–3.5 |
| α-methylstyrene | 0.75–2.0 |
| dicyclopentadiene | 10–20 |
| vinyltoluene | 0.02–0.08 |
| indene | 0.1–0.3 |
| $C_8$ olefinic substituted aromatic | 0.02–0.05 |
| $C_9$ olefinic substituted aromatic | 0.03–0.06 |
| $C_{10}$ olefinic substituted aromatic | 0.05–0.15 |
| $C_9$ alkenylbenzene | 0.03–0.09 |
| cis-propenylbenzene | 0.01–0.04 |
| Alkynes | 0.5–2.0 |
| Cyclic Aliphatic | |
| methylenecyclopentane | 0.02–0.06 |
| methylcyclopentene | 0.05–0.15 |
| cyclohexadiene | 0.25–1.0 |
| $C_7$ olefinic substituted naphthenes | 0.2–0.8 |
| Unknown olefinic | 0–2.0 |
| Unknown non-olefinic | 0.04–0.20 |

As will be appreciated this starting hydrocarbon mixture contains a wide variety of diene and pseudodiene compounds and other materials, a large portion of which is not easily identifiable by standard analytic methods. It is surprising that a crude mixture of this diversity would enter into a reaction with sulfur to provide a useful composition as described herein.

To conduct the reaction, the sulfur is raised to sufficient temperatures preferably by indirect heat. In general, this requires a temperature in the range of about 100°–150° C., preferably 115°–135° C. Thereafter, the hydrocarbon mixture is added to the sulfur, followed by a reaction period from about 10 minutes to 24 hours at the reaction temperature. The unreacted organic compounds, with gum precursors essentially removed, are recovered as overhead product by flash distillation or the like. Rate of reaction depends upon various factors such as pressure, rate of agitation, catalyst, reflux ratio, composition of feedstocks, and temperature. The bottom mixture, which is the sulfur-diene reaction product, may be mixed with fillers or aggregates, stored or transported in heated vessels, or allowed to cool and solidify, as described in our parent application. For some applications, the material may be remelted immediately or stored in the solid form and then remelted.

It is within the scope of the present invention to form the adduct in the presence of viscosity stabilizers and antioxidants, or to introduce such additives after the reaction has been completed, and to add any filler to the formed adduct prior to or after removal of the adduct from the reactor.

Any tendency of the DAC/sulfur adduct to become rubbery on heating can be controlled by such methods as addition of conventional chain terminators or chain regulators. Examples of such terminators and regulators are alkyl mercaptans, p-phenylenediamines, sodium salt of dialkyldithiocarbamic acid, hindered phenols, and the like.

The elemental sulfur may be either crystalline or amorphous and may contain small amounts of impurities such as those normally found in commercial grades of sulfur, without deleterious effects. It is readily and inexpensively available from a variety of sources such as mining by the Frasch process or recovery from waste gases by the Claus process.

Reference is now made to the drawing accompanying the application which is a flow sheet description of the process. In the process of the drawing, a pressurized reaction vessel provided with a magnetic stirrer, is employed for the removal of dienes and pseudodienes from the hydrocarbon concentrate. As may be seen, hydrocarbon reactant from hydrocarbon storage 1 is passed by line 2 to reactor 3 provided with agitation 4. Simultaneously, sulfur from sulfur storage 5 is passed by line 6 to reactor 3. The reaction between the sulfur and hydrocarbon in reactor 3 is then carried out at temperatures of about 100°–150° C. for about 10 minutes to 24 hours with vigorous agitation.

The resulting reaction mixture is then removed by line 7 to distillation column 8 where unreacted material is taken off overhead by line 9, condensed at 10 with recycle via line 11. Volatiles are vented by line 12 and the upgraded hydrocarbon is recovered at line 13.

In the meantime, the sulfur reaction product is removed from the bottom of distillation column 8 by line 14, with continuous recycle by line 15. The sulfur-diene reaction product is thus recovered from line 16.

In the apparatus of this process, it is preferred that a magnetic coupled drive system be used instead of a solid shaft arrangement due to the requirements of having to seal the reactor under both pressure and vacuum conditions. A model 1.5–1.0 Magne Drive II, manufactured by Autoclave Engineers, Erie, Pa., is suitable for mixing the reactants. A tachometer is used to measure the rotational speed of the impeller inside the sealed reaction vessel.

Temperatures during DAC-sulfur, HAC-sulfur, dripolene-sulfur, etc. preparations are monitored by placing thermocouples at the bottom of the reaction mixture, at the liquid/gas interface of the mixture, and at the gaseous phase. The DAC or HAC to be reacted with the molten sulfur is pumped subsurface into the reactor.

Unreacted organic compounds are recovered with overhead collection equipment comprising a water condenser, followed by two Dry Ice cooled receivers, two vacuum traps, a fritted-glass gas scrubber, a rotameter for measuring volumes of off-gases, and a vacuum pump.

The following examples are presented to illustrate the invention, but it is not considered to be limited thereto. In these examples, and throughout the specification, parts are by weight unless otherwise indicated.

EXAMPLE 1

In this example, the reaction mixture comprised 3165 g (79 wt. %) sulfur and 843 g (21 wt. %) DAC. The reaction temperature averaged 130° C. for the 120-minute reaction time. Pressure during the reaction increased to a maximum of 48 psig, then decreased as the reaction progressed in response to the incorporation of the dienes into sulfur compounds. Average pressure for the duration of the reaction was 41 psig. The reaction vessel comprised the pressure reactor and overhead recovery equipment as illustrated in the drawing. After the reaction time was completed, unreacted organic compounds were removed, first at ambient pressure, followed by a vacuum distillation to a final pressure of 50 mm Hg. The modified sulfur adduct was drained from the reactor and allowed to cool.

The yield of modified sulfur, 3509 grams, had about 89 wt. % total sulfur content. The overhead condensates recovered from the reaction were analyzed by gas chromatography and revealed diene and pseudodiene concentrations of about 0.4 area percent. This represented about 99% efficiency of diene and pseudodiene removal from the DAC feed through reaction with sulfur.

EXAMPLE 2

In this experiment, the reaction mixture comprised 2250 g (65 wt. %) sulfur and 1198 g (35 wt. %) DAC. The reaction temperature averaged 129° C. for a 120-minute reaction time. Pressure during the reaction increased to a maximum of 46 psig, then decreased as the reaction progressed in response to the incorporation of the dienes into sulfur compounds. Average pressure for the duration of the reaction was 43 psig. The reaction vessel and overhead condensate recovery equipment were the same as used for Example 1 as was removal of unreacted organics. The modified sulfur adduct was drained from the reactor and allowed to cool.

The yield of modified sulfur was 2,692 grams and contained about 83 wt. % sulfur. The overhead condensates recovered from the reaction were analyzed by gas chromatography and revealed diene and pseudodiene concentrations of about 0.4 area percent. This represented about 99% efficiency of diene and pseudodiene removal from the DAC feed through reaction with sulfur.

EXAMPLE 3

In this example, the reaction mixture comprised about 1749 g (56 wt. %) sulfur and about 1398 g (44 wt. %) DAC. The reaction temperature averaged 130° C. for the 120-minute reaction time. Pressure exerted by the reaction mixture averaged 44 psig with a maximum of 48 psig. The reaction vessel, overhead recovery equipment, and method of removing unreacted organic compound are the same as in Examples 1 and 2.

The yield of modified sulfur was 2261 grams and contained about 75 wt. % sulfur. The overhead condensates recovered from the reaction were analyzed by gas chromatography and revealed diene and pseudodiene concentrates of about 1 area percent. This represented about 99% efficiency of diene and pseudodiene removal from the DAC feed through reaction with sulfur.

EXAMPLE 4

In this example, the reaction mixture comprised about 8000 g (76 wt. %) of sulfur and about 2506 g (24 wt. %) DAC. The reaction temperature averaged 115° C. for the approximately 18-hour reaction time. Reaction was conducted at ambient pressure under reflux with a reflux ratio of 3:1. This adduct had a dark brown color and became solid and brittle after cooling.

The yield of modified sulfur was 8854 grams. The overhead condensates recovered from the reaction were analyzed by gas chromatography to reveal diene and pseudodiene concentrations of about 2.0 area percent. This represented about 91% efficiency of diene and pseudodiene removal from the DAC feed through reaction with sulfur.

EXAMPLE 5

Following the procedure of Example 1, 2351 g (53 wt. %) of the DAC is pumped at an initial rate of 30 g/min. into 2103 g (47 wt. %) of the sulfur. The reaction temperature averages 125° C. for the 125-minute reaction time. During the reaction, the pressure increases to a maximum of 62 psig, with the average pressure being 51 psig. After removing the unreacted material, there is recovered 2866 g (64 wt. %) of black adduct containing 73 wt. % sulfur. Analysis of the unreacted material shows 96% efficiency of diene and pseudodiene removal from the feed.

EXAMPLE 6

Following the procedure of Example 1, 3113 g (58 wt. %) of the DAC is pumped at an initial rate of 31 g/min. into 2228 g (42 wt. %) of the sulfur. The reaction temperature averages 124° C. for the 155-minute reaction time. During the reaction, the pressure increases to a maximum of 58 psig, with the average pressure being 47 psig. After removing the unreacted material, there is recovered 3185 g (61 wt. %) of black adduct containing 69 wt. % sulfur. Analysis of the unreacted material shows 95% efficiency of diene and pseudodiene removal from the feed.

EXAMPLE 7

Following the procedure of Example 1, 2386 of (53 wt. %) of the DAC is pumped at an initial rate of 31 g/min. into 2132 g (47 wt. %) of the sulfur. The reaction temperature averages 129.4° C. for the 120-minute reaction time. During the reaction, the pressure increases to a maximum of 67 psig, with the average pressure being 57 psig. After removing the unreacted material, there is recovered 2901 g (66 wt. %) of black adduct containing 73 wt. % sulfur. Analysis of the unreacted material shows 95% efficiency of diene and pseudodiene removal from the feed.

EXAMPLE 8

Following the procedure of Example 1, 3165 g (87 wt. %) of the DAC is pumped into 474 g (13 wt. %) of the molten sulfur. The reaction temperature averages 130.5° C. for the 120-minute reaction time. During the reaction, the pressure increases to a maximum of 52 psig, with the average pressure being 47 psig. After removing the unreacted material, there is recovered 3354 g (93 wt. %) of black adduct containing 95 wt. % sulfur. Analysis of the unreacted material shows 93% efficiency of diene and pseudodiene removal.

In the following examples, DAC feedstocks obtained from B. F. Goodrich were subjected to reaction with sulfur. Table III shows the analysis of the feedstocks used in these examples. Tables IV and V show the reaction conditions and results.

TABLE III

| Component | Feed amount wt. % | Unreacted amount recovered wt. % |
|---|---|---|
| Olefins | | |
| propene | 0.083 | 0.022 |
| butene | 0.727 | 0.107 |
| butadienes | 3.529 | 0.213 |
| pentadienes | 6.069 | 0.143 |
| pentene | 0.189 | 0.099 |
| hexadienes | 1.296 | 0.940 |
| pentatrienes | 0.032 | 0.074 |
| methylenecyclopentane | 0.039 | 0 |
| methylpentadienes | 0.117 | 0.037 |
| methylcyclopentene | 0.084 | 0 |
| cyclohexadiene | 0.592 | 0 |
| styrene | 2.670 | 0.020 |
| α-methylstyrene | 1.635 | 0 |
| dicyclopentadiene | 14.910 | 0 |
| vinyltoluene | 0.051 | 0 |
| indene | 0.228 | 0 |
| $C_7$ olefinic substituted naphthenes* | 0.411 | 0.044 |
| $C_8$ olefinic substituted aromatic* | 0.034 | 0 |
| $C_9$ olefinic substituted aromatic* | 0.042 | 0.119 |
| $C_{10}$ olefinic substituted aromatic* | 0.093 | 0.021 |
| $C_9$ alkenylbenzene | 0.059 | 0 |
| cis-propenylbenzene | 0.030 | 0 |
| unknown olefinic* | 1.781 | 0.315 |
| Total olefinic | 34.701 | 3.049 |
| Alkynes | | |
| butyne | 1.090 | 0.016 |
| Paraffins | | |
| $C_5$ | 0.133 | 0.797 |
| Aromatics | | |
| benzene | 48.093 | 79.381 |
| toluene | 10.722 | 15.283 |
| ethylbenzene | 0.525 | 0.586 |
| m-xylene | 0.375 | 0.397 |
| p-xylene | 0.183 | 0.212 |
| cumene | 0.031 | 0 |
| o-xylene | 0.290 | 0.203 |
| n-propylbenzene | 0.239 | 0 |
| m-ethyltoluene | 0 | 0.015 |
| 1,3,5-trimethylbenzene | 0.215 | 0 |
| sec-butylbenzene | 0.066 | 0 |
| o-ethyltoluene | 0.471 | 0 |
| t-butylbenzene | 0 | 0.061 |
| 1,2,4-trimethylbenzene | 0.869 | 0 |
| o-cymene | 0.040 | 0 |
| indane | 1.843 | 0 |
| Total Aromatics | 64.009 | 96.138 |
| unknown non-olefinic* | 0.114 | 0 |
| Grand Total | 100.0 | 100.0 |

*Identified as olefinic or non olefinic by treating Goodrich DAC with Burrell "Sorbent A" (mercury complex with a strong affinity for olefins).

TABLE IV

| | REACTION MIXTURE | | | | REACTION CONDITIONS | | |
| | DAC | | SULFUR | | | | |
| Ex. No. | Wt. GMS | Wt. % | Wt. GMS | Wt. % | Temp Deg. C. | Time Min. | Press PSIG |
|---|---|---|---|---|---|---|---|
| 9 | 843. | 21. | 3165. | 79. | 130. | 120. | 41. |
| 10 | 843. | 21. | 3166. | 79. | 130. | 120. | 42. |
| 11 | 1198. | 35. | 2250. | 65. | 129. | 120. | 43. |
| 12 | 1399. | 45. | 1702. | 55. | 130. | 120. | 48. |
| 13 | 844. | 21. | 3164. | 79. | 125. | 120. | 37. |
| 14 | 2351. | 53. | 2103. | 47. | 125. | 125. | 51. |
| 15 | 3113. | 58. | 2228. | 42. | 124. | 155. | 47. |
| 16 | 2386. | 53. | 2132. | 47. | 129. | 120. | 57. |
| 17 | 1261. | 21. | 4692. | 79. | 135. | 60. | 60. |
| 18 | 1256. | 21. | 4749. | 79. | 116. | 120. | 50. |
| 19 | 1268. | 21. | 4752. | 79. | 116. | 120. | 50. |

As a result of these experiments, the following products and amounts were recovered:

TABLE V

| | DAC/S ADDUCT | | COMPOSITE OVERHEAD | | | RECOVERY | DAC Pump |
| Ex. No. | Wt. GMS | Wt. % (1) | Wt. GMS | Wt. % (1) | Wt. % (2) | Wt. % (3) | Rate (4) GMS/MIN |
|---|---|---|---|---|---|---|---|
| 9 | 3509. | 88. | 494. | 12. | 59. | 100. | 33. |
| 10 | 3490. | 88. | 476. | 12. | 56. | 99. | 32. |
| 11 | 2692. | 79. | 711. | 21. | 59. | 99. | 34. |
| 12 | 2125. | 71. | 865. | 29. | 62. | 96. | 31. |
| 13 | 3473. | 87. | 513. | 13. | 61. | 99. | 33. |
| 14 | 2866. | 65. | 1539. | 35. | 65. | 99. | 31. |
| 15 | 3185. | 61. | 2007. | 39. | 64. | 97. | 31. |
| 16 | 2901. | 66. | 1509. | 34. | 63. | 98. | 31. |
| 17 | 4973. | 83. | 1012. | 17. | 80. | 101. | 30. |
| 18 | 5050. | 85. | 885. | 15. | 70. | 99. | 31. |
| 19 | 5104. | 86. | 812. | 14. | 64. | 98. | 32. |

LEGEND
(1) Basis: Adduct plus overhead
(2) Basis: DAC Feed
(3) Adduct plus overhead divided by Reaction Mixture
(4) Initial pump rate. Rate changed as pressure increased.

The invention has been described herein with reference to certain preferred embodiments; however, as obvious variations thereon will become apparent to those skilled in the art, the invention is not to be limited thereto.

What is claimed is:

1. A method for the upgrading of by-product hydrocarbon mixtures to reduce their content of gum precursors, the process comprising:
   (a) obtaining a hydrocarbon mixture containing about 60-90 wt.% of aromatic components, about 3-40 wt.% of dienes and pseudodienes, and up to about 6 wt.% of relatively unreactive organic compounds;
   (b) raising elemental sulfur to a temperature of about 115°-135° C. in a reaction vessel;
   (c) adding said hydrocarbon mixture to said elemental sulfur in the approximate weight ratio of about 5-95 wt.% of the hydrocarbon mixture with about 95-5 wt.% of elemental sulfur to form a reaction mixture;
   (d) maintaining said reaction mixture at the temperature range of about 115°-135° C. for a time period of 10 minutes to 24 hours, with good mixing of said sulfur and said hydrocarbon mixture; and
   (e) removing the unreacted hydrocarbon materials by distillation.

2. The process of claim 1 wherein the by-product mixture is selected from the group consisting of depentanized aromatic concentrate, heavy aromatic concentrate, dripolene, light oil from coal processing, and mixtures thereof.

3. The process of claim 2 wherein the hydrocarbon mixture is depentanized aromatic concentrate.

4. The process of claim 1 wherein the hydrocarbon mixture contains monoolefins in substantially the same stoichiometric amount for reaction with the sulfur, as there are dienes and pseudodienes present in the mixture.

5. The process of claim 1 wherein the reaction temperature is about 125°-130° C.

6. The process of claim 1 wherein the reaction is carried out at superatmospheric pressure ranging up to about 1000 p.s.i.g.

7. The process of claim 1 wherein the reaction time is about six hours.

* * * * *